United States Patent [19]

Nezu et al.

[11] Patent Number: 6,079,526
[45] Date of Patent: Jun. 27, 2000

[54] DAMPING FORCE CONTROL TYPE HYDRAULIC SHOCK ABSORBER

[75] Inventors: Takashi Nezu, Tokyo; Akira Kashiwagi; Takao Nakadate, both of Kanagawa-ken, all of Japan

[73] Assignee: Tokico Ltd., Kawasaki, Japan

[21] Appl. No.: 08/770,985

[22] Filed: Dec. 20, 1996

[30] Foreign Application Priority Data

Dec. 26, 1995 [JP] Japan ................................. 7-351668
Jul. 16, 1996 [JP] Japan ................................. 8-205375

[51] Int. Cl.$^7$ .................................................. F16D 57/00
[52] U.S. Cl. .......................................................... 188/266.6
[58] Field of Search .............................. 188/266.4, 266.6, 188/318, 322.13, 299.1, 266.1, 266.2, 313, 319, 266.3, 266.5

[56] References Cited

U.S. PATENT DOCUMENTS

| | | | |
|---|---|---|---|
| 5,409,090 | 4/1995 | Kashiwagi et al. ................... | 188/282.1 |
| 5,431,259 | 7/1995 | Mizutani et al. ...................... | 188/266.6 |
| 5,586,627 | 12/1996 | Nezu et al. ............................ | 188/288.6 |
| 5,655,633 | 8/1997 | Nakadate et al. . | |

FOREIGN PATENT DOCUMENTS

88 15 444  3/1989  Germany .
41 04 110 A1  8/1992  Germany .
195 18 560 A1  11/1995  Germany .

*Primary Examiner*—Mark T. Le
*Assistant Examiner*—Melanie Talavera
*Attorney, Agent, or Firm*—Wenderoth, Lind & Ponack, L.L.P.

[57] ABSTRACT

A damping force control type hydraulic shock absorber is provided having a broad damping force control range and is capable of obtaining appropriate damping force over the entire piston speed range from a low speed region to a high speed region. A piston is fitted in a cylinder, and a reservoir is connected to the cylinder. A cylinder upper chamber and the reservoir are communicated through a main passage in which a main damping valve is provided. The cylinder upper and lower chambers are communicated through an extension sub-passage in which an extension sub-damping valve and an extension variable orifice are provided. The cylinder lower chamber and the reservoir are communicated through a compression sub-passage in which a compression sub-damping valve and a compression variable orifice are provided. By changing the flow path areas of the variable orifices, orifice characteristics for the extension and compression strokes are controlled, and the pilot pressure is also changed to control the valve opening pressure of the main damping valve.

2 Claims, 5 Drawing Sheets

Fig. 5

DAMPING FORCE CONTROL TYPE HYDRAULIC SHOCK ABSORBER

BACKGROUND OF THE INVENTION

The present invention relates to a damping force control type hydraulic shock absorber attached to a suspension system of a vehicle, for example, an automobile.

Hydraulic shock absorbers attached to suspension systems of automobiles or other vehicles include damping force control type hydraulic shock absorbers which are arranged such that the level of damping force can be properly controlled in accordance with the road surface conditions, vehicle running conditions, etc., with a view to improving the ride quality and the steering stability.

In general, this type of hydraulic shock absorber includes a cylinder having a hydraulic fluid sealed therein. A piston, which has a piston rod connected thereto to constitute a piston assembly, is slidably fitted in the cylinder to divide the inside of the cylinder into two chambers. The piston assembly is provided with a main hydraulic fluid passage and a bypass passage, which provide communication between the two chambers in the cylinder. The main hydraulic fluid passage is provided with a damping force generating mechanism including an orifice and a disk valve. The bypass passage is provided with a damping force control valve for controlling the flow path area of the bypass passage. It should be noted that a reservoir is connected, via a base value, to one of the chambers in the cylinder to compensate for a volumetric change in the cylinder due to extension and compression of the piston rod by the compression and expansion of a gas sealed in the reservoir.

With the above arrangement, when the bypass passage is opened by the damping force control valve, the flow resistance to the hydraulic fluid flowing between the two chambers in the cylinder is reduced, thereby reducing damping force. When the bypass passage is closed, the flow resistance between the two chambers is increased, thereby increasing damping force. Thus, damping force characteristics can be properly controlled by opening and closing the damping force control valve.

However, the above-described arrangement, in which damping force is controlled by changing the flow path area of the bypass passage, suffers from the problem that although the damping force characteristics can be changed to a considerable extent in the low piston speed region because damping force depends on the orifice area of the bypass passage, the damping force characteristics cannot greatly be changed in the intermediate and high piston speed regions because in these regions damping force depends on the damping force generating mechanism (disk valve, etc.; the constant level of the valve opening pressure) of the main hydraulic fluid passage.

To solve the above problem, there has heretofore been proposed a damping force control type hydraulic shock absorber in which a pressure chamber is formed at the back of a main valve serving as a damping force generating mechanism in a main hydraulic fluid passage which allows a hydraulic fluid to flow therethrough in response to the movement of a piston. The pressure chamber is communicated with a part of the main passage on the upstream side of the main valve through a fixed orifice and also communicated with a part of the main passage on the downstream side of the main valve through a variable orifice. This device is disclosed, for example, in Japanese Patent Application Unexamined Publication (KOKAI) No. 4-312227.

According to the above damping force control type hydraulic shock absorber, by opening and closing the variable orifice, the flow path area for hydraulic fluid is directly controlled, and the pressure in the pressure chamber is also changed. Thus, the valve opening initial pressure of the main valve can be changed. Accordingly, it is possible to simultaneously control orifice characteristics (in which damping force is approximately proportional to the square of the piston speed) and valve characteristics (in which damping force is approximately proportional to the piston speed), and hence possible to widen the control range for damping force characteristics.

In the above-described damping force control type hydraulic shock absorber, however, before the main valve opens, damping force due to orifice characteristics, which depends on the flow path area of the variable orifice, is generated. Therefore, if it is intended to ensure sufficient damping force in the low piston speed region, the damping force is likely to become excessively strong in the vicinity of the valve opening point of the main valve; if it is intended to obtain appropriate damping force in the vicinity of the main valve opening point, it is likely to become difficult to obtain sufficient damping force in the low piston speed region. Therefore, it is difficult to properly set damping force in the piston speed range from the low speed region to the vicinity of the main valve opening point.

SUMMARY OF THE INVENTION

In view of the above-described circumstances, an object of the present invention is to provide a damping force control type hydraulic shock absorber capable of obtaining appropriate damping force over the entire piston speed range from the low speed region to the high speed region, and hence capable of providing appropriate damping force characteristics.

The present invention provides a damping force control type hydraulic shock absorber including a cylinder having a hydraulic fluid sealed therein, and a reservoir having a gas sealed therein, together with the hydraulic fluid. A piston is slidably fitted in the cylinder to divide the inside of the cylinder into a first chamber and a second chamber. A piston rod is connected at one end thereof to the piston. The other end of the piston rod extends through the first chamber and out of the cylinder. A first communicating passage is provided in the piston to provide communication between the first and second chambers. A first check valve is provided in the first communicating passage to allow the hydraulic fluid to flow in only one direction from the second chamber toward the first chamber. A second communicating passage provides communication between the second chamber and the reservoir. A second check valve is provided in the second communicating passage to allow the hydraulic fluid to flow in only one direction from the reservoir toward the second chamber. A main passage provides communication between the first chamber and the reservoir. An extension sub-passage allows the first chamber and the second chamber to communicate with each other in parallel to the first communicating passage. A compression sub-passage allows the second chamber and the reservoir to communicate with each other in parallel to the second communicating passage. A pilot-operated main damping valve is provided in the main passage to generate damping force by controlling the flow of hydraulic fluid through the main passage and to control the damping force according to a pilot pressure introduced through each of a first and second pilot lines. An extension sub-damping valve and an extension variable orifice are provided in the extension sub-passage. The extension sub-damping valve is arranged to open at a lower pressure than the pilot-operated main damping valve. A compression sub-damping valve and a compression variable orifice are provided in the compression sub-passage. The compression sub-damping valve is arranged to open at a lower pressure than the pilot-operated main damping valve. The first pilot line is connected to a point of the extension sub-passage between the extension sub-damping valve and the extension variable orifice. The second pilot line is connected to a point of the compression sub-passage between the compression sub-damping valve and the compression variable orifice.

By virtue of the above-described arrangement, during the extension stroke of the piston rod, the first check valve is closed, and the hydraulic fluid in the first chamber flows to the reservoir through the main passage and also flows to the second chamber through the extension sub-passage. Further, an amount of hydraulic fluid corresponding to an amount by which the piston rod withdraws from the cylinder flows from the reservoir to the second chamber through the second check valve. At this time, by changing the passage area of the extension variable orifice, the passage area of the extension sub-passage is directly changed, and the pilot pressure introduced through the first pilot line is also changed. Thus, the valve opening characteristics of the main damping valve can be changed. During the compression stroke of the piston rod, the first check valve opens, while the second check valve is closed. Consequently, an amount of hydraulic fluid corresponding to an amount by which the piston rod enters the cylinder flows from the first chamber to the reservoir through the main passage, and the hydraulic fluid in the second chamber flows to the reservoir through the compression sub-passage. At this time, by changing the passage area of the compression variable orifice, the passage area of the compression sub-passage is directly changed, and the pilot pressure introduced through the second pilot line is also changed. Thus, the valve opening characteristics of the main damping valve can be changed. Before the main damping valve opens, damping force of valve characteristics is generated by the extension and compression sub-damping valves.

DETAILED DESCRIPTION OF THE PREFERRED EMBODIMENTS

Embodiments of the present invention will be described below in detail with reference to the accompanying drawings.

Figure 1:
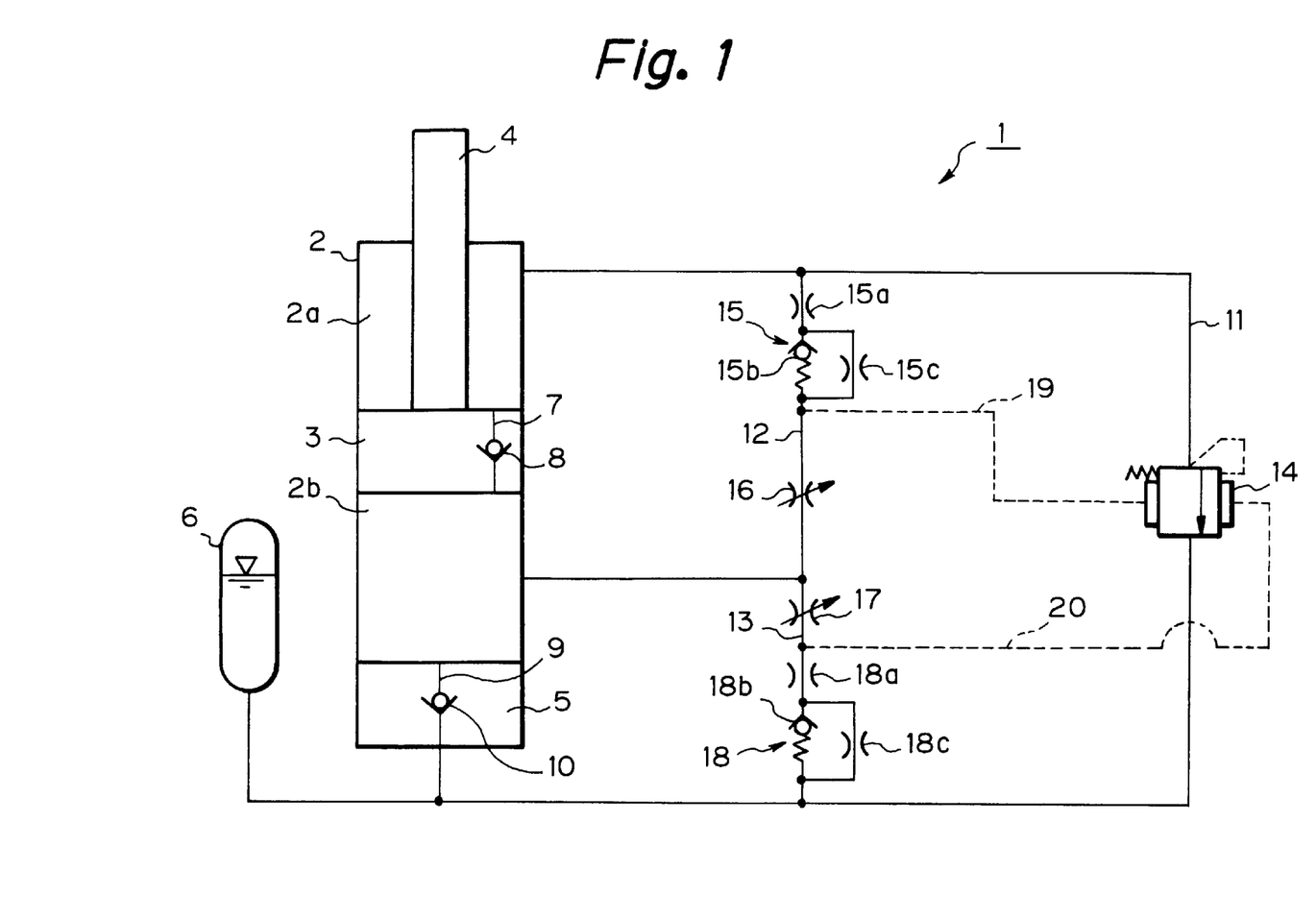
FIG. 1 is a hydraulic circuit diagram of a damping force control type hydraulic shock absorber according to a first embodiment of the present invention.

A hydraulic circuit of a damping force control type hydraulic shock absorber according to a first embodiment of the present invention will be described with reference to FIG. 1. As shown in FIG. 1, the damping force control type hydraulic shock absorber 1 includes a cylinder 2 having a hydraulic fluid sealed therein. A piston 3 is slidably fitted in the cylinder 2. The piston 3 divides the cylinder 2 into two chambers, that is, a cylinder upper chamber 2a (first chamber) and a cylinder lower chamber 2b (second chamber). The piston 3 is connected with one end of a piston rod 4. The other end portion of the piston rod 4 extends through the cylinder upper chamber 2a and projects out of the cylinder 2. A reservoir 6 is connected to the cylinder lower chamber 2b through a base valve 5 provided in the bottom of the cylinder 2. The reservoir 6 has a gas sealed therein, together with the hydraulic fluid.

The piston 3 is provided with a hydraulic fluid passage 7 (first communicating passage) for communication between the cylinder upper and lower chambers 2a and 2b. The piston 3 is further provided with a check valve 8 (first check valve) which allows the hydraulic fluid to flow through the hydraulic fluid passage 7 in only one direction from the cylinder lower chamber 2b toward the cylinder upper chamber 2a. The base valve 5 is provided with a hydraulic fluid passage 9 (second communicating passage) for communication between the cylinder lower chamber 2b and the reservoir 6. The base valve 5 is further provided with a check valve 10 (second check valve) which allows the hydraulic fluid to flow through the hydraulic fluid passage 9 in only one direction from the reservoir 6 toward the cylinder lower chamber 2b.

A main passage 11, an extension sub-passage 12, and a compression sub-passage 13 are provided outside the cylinder 2. The main passage 11 provides communication between the cylinder upper chamber 2a and the reservoir 6. The extension sub-passage 12 allows the cylinder upper chamber 2a and the cylinder lower chamber 2b to communicate with each other in parallel to the hydraulic fluid passage 7 in the piston 3. The compression sub-passage 13 allows the cylinder lower chamber 2b and the reservoir 6 to communicate with each other in parallel to the hydraulic fluid passage 9. The main passage 11 is provided with a pilot-operated main damping valve 14 (hereinafter referred to as "main damping valve 14"). The extension sub-passage 12 is provided with an extension sub-damping valve 15 and a variable orifice 16 (extension variable orifice). The variable orifice 16 is located on the downstream side (i.e. on the cylinder lower chamber side) of the extension sub-damping valve 15. The compression sub-passage 13 is provided with a variable orifice 17 (compression variable orifice), and a compression sub-damping valve 18. The compression sub-damping valve 18 is located downstream (i.e. on the reservoir side of) the variable orifice 17.

The main damping valve 14 is a pilot-operated pressure control valve which opens upon receiving pressure on the cylinder upper chamber side of the main passage 11 and generates damping force according to the degree of opening of the valve 14. An extension pilot line 19 (first pilot line) of the main damping valve 14 is connected to a point of the extension sub-passage 12 between the extension sub-damping valve 15 and the variable orifice 16 to introduce the pressure at that point as a pilot pressure. The arrangement is such that the valve opening pressure of the main damping valve 14 increases as the pilot pressure rises. Hereinafter, the pilot pressure introduced through the extension pilot line 19 will be referred to as "closing pilot pressure". A compression pilot line 20 is connected to a point of the compression sub-passage 13 between the variable orifice 17 and the compression sub-damping valve 18 to introduce the pressure at that point as a pilot pressure. The arrangement is such that the valve opening pressure of the main damping valve 14 reduces as the pilot pressure rises. Hereinafter, the pilot pressure introduced through the compression pilot line 20 will be referred to as "opening pilot pressure".

The extension sub-damping valve 15 comprises an orifice 15a and a pressure-regulating valve 15b, which are disposed in series in order from the upstream side, and an orifice 15c which is disposed in parallel to the pressure-regulating valve 15b.

The orifice 15a prevents an excessive increase of damping force in the high piston speed region on a low damping force characteristic setting (where the flow path area of the variable orifice 16 is the largest). More specifically, the orifice 15a prevents the valve opening pressure of the main damping valve 14 from excessively increasing as a result of a rise in the closing pilot pressure due to a pressure loss produced on the downstream side of the extension sub-damping valve 15 (even if the variable orifice 16 is fully open, the flow resistance is increased by an increase in the piston speed). For this purpose, the flow path area of the orifice 15a is set to be about ½ of the smallest flow path area of the downstream side of the extension sub-damping valve 15 when the variable orifice 16 is fully open so that the flow path upstream of the point of connection with the extension pilot line 19 can be satisfactorily restricted even when the pressure-regulating valve 15b is fully open. Thus, even in the high piston speed region, the closing pilot pressure can be held at a sufficiently low level, and the valve opening pressure of the main damping valve 14 can be appropriately maintained.

The pressure-regulating valve 15b is normally closed, but opens according to the pressure of hydraulic fluid and controls the flow path area according to the degree of opening of the valve 15b. It should be noted that the orifice 15a may be omitted in a case where the pressure-reducing effect of the pressure-regulating valve 15b is so powerful in the high piston speed region that the flow resistance of the pressure-regulating valve 15b can satisfactorily hold the closing pilot pressure at such a low level that the pressure loss in the extension sub-passage 12 on the downstream side of the extension sub-damping valve 15 causes no problem.

The orifice 15c prevents an excessive reduction of damping force in the low piston speed region on a high damping force characteristic setting (where the flow path area of the variable orifice 16 is the smallest). More specifically, there is a small leakage of hydraulic fluid on the downstream side of the extension sub-damping valve 15 (i.e. a leakage of hydraulic fluid from a small gap between flow path-constituting elements which occurs even when the variable orifice 16 is fully closed). Therefore, in order to prevent the valve opening pressure of the main damping valve 14 from excessively decreasing as a result of a reduction in the closing pilot pressure due to the leakage of hydraulic fluid, the flow path area of the orifice 15c is set equivalent to about 2 to 3 times a flow path area at which a leakage is produced on the downstream side of the extension sub-damping valve 15 when the variable orifice 16 is fully closed. Thus, even in the low piston speed region, the closing pilot pressure can be held at a sufficiently high level, and the valve opening pressure of the main damping valve 14 can be appropriately maintained.

The compression sub-damping valve 18 comprises an orifice 18a and a pressure-regulating valve 18b, which are disposed in series in order from the upstream side, and an orifice 18c which is disposed in parallel to the pressure-regulating valve 18b.

The orifice 18a prevents an excessive increase of damping force due to a reduction in the opening pilot pressure in the high piston speed region on a low damping force characteristic setting (where the flow path area of the variable orifice 17 is the largest). The flow path area of the orifice 18a is set to be about ½ of the smallest flow path area of the upstream side of the compression sub-damping valve 18 when the variable orifice 17 is fully open, as in the case of the orifice 15a.

The pressure-regulating valve 18b is normally closed, but opens according to the pressure of hydraulic fluid and controls the flow path area according to the degree of opening of the valve 18b. It should be noted that the orifice 18a may be omitted in a case where the pressure-reducing effect of the pressure-regulating valve 18b is so powerful in the high piston speed region that the flow resistance of the pressure-regulating valve 18b can satisfactorily maintain the opening pilot pressure at such a high level that the pressure loss in the compression sub-passage 13 on the upstream side of the compression sub-damping valve 18 causes no problem.

The orifice 18c prevents an excessive reduction of damping force due to an increase in the opening pilot pressure in the low piston speed region on a high damping force characteristic setting (the flow path area of the variable orifice 17 is the smallest). The flow path area of the orifice 18c is set equivalent to about 2 to 3 times a flow path area at which a leakage is produced on the upstream side of the compression sub-damping valve 18 when the variable orifice 17 is fully closed, as in the case of the orifice 15c.

The operation of this embodiment, arranged as stated above, will be described below.

During the extension stroke of the piston rod 4, as the piston 3 moves, the check valve 8 of the piston 3 is closed, and the hydraulic fluid in the cylinder upper chamber 2a is pressurized. Consequently, the hydraulic fluid flows to the reservoir 6 through the main passage 11, and also flows to the cylinder lower chamber 2b through the extension sub-passage 12. Meanwhile, an amount of hydraulic fluid corresponding to an amount by which the piston rod 4 withdraws from the cylinder 2 flows from the reservoir 6 to the cylinder lower chamber 2b through the check valve 10 of the base valve 5.

When the piston speed is low before the main damping valve 14 of the main passage 11 opens, damping force is generated by the extension sub-damping valve 15 and variable orifice 16 of the extension sub-passage 12. In the extension sub-damping valve 15, damping force due to orifice characteristics is generated by the orifice 15c before the pressure-regulating valve 15b opens. After the pressure-regulating valve 15b has opened, the flow path area is controlled according to the degree of opening of the valve 15b, thereby generating damping force due to valve characteristics. In this way, appropriate damping force can be obtained over the piston speed range due to from the low speed region to the intermediate speed region.

As the piston speed increases, the pressure in the cylinder upper chamber 2a rises, and eventually the main damping valve 14 opens. After the main damping valve 14 has opened, damping force according to the degree of opening of the valve 14 is generated. At this time, as the passage area of the variable orifice 16 decreases, the pressure loss increases, and the pressure on the upstream side of the variable orifice 16 increases. Consequently, the closing pilot pressure, which is introduced through the extension pilot line 19, increases, and the valve opening pressure of the main damping valve 14 increases because the closing pilot pressure acts on the main damping valve 14 in the direction which closes valve 14. Accordingly, by changing the passage area of the variable orifice 16, the flow path area of the extension sub-passage 12 [i.e. orifice characteristics (orifice 15c) and valve characteristics (pressure-regulating valve 15b)] is directly changed, and the closing pilot pressure is also changed. Thus, the valve opening pressure (valve characteristics) of the main damping valve 14 can be changed. Therefore, the damping force characteristic control range can be widened.

During the compression stroke of the piston rod 4, as the piston 3 moves, the check valve 8 of the piston 3 opens. As a result, the pressures in the cylinder upper and lower chambers 2a and 2b become approximately the same. Meanwhile, the check valve 10 of the base valve 5 is closed, and the hydraulic fluid in the cylinder 2 is pressurized. Consequently, an amount of hydraulic fluid corresponding to an amount by which the piston rod 4 enters the cylinder 2 flows from the cylinder upper chamber 2a to the reservoir 6 through the main passage 11 and also flows from the cylinder lower chamber 2b to the reservoir 6 through the compression sub-passage 13.

When the piston speed is low before the main damping valve 14 of the main passage 11 opens, damping force is generated by the variable orifice 17 and compression sub-damping valve 18 of the compression sub-passage 13. In the compression sub-damping valve 18, damping force of orifice characteristics is generated by the orifice 18c before the pressure-regulating valve 18b opens. After the pressure-regulating valve 18b has opened, the flow path area is controlled according to the degree of opening of the valve 18b, thereby generating damping force due to valve characteristics. In this way, appropriate damping force can be obtained over the piston speed range from the low speed region to the intermediate speed region.

As the piston speed increases, the pressure in the cylinder upper chamber 2a rises, and eventually the main damping valve 14 opens. After the main damping valve 14 has opened, damping force according to the degree of opening of the valve 14 is generated. At this time, as the passage area of the variable orifice 17 increases, the pressure loss decreases, and the pressure on the downstream side of the variable orifice 17 increases. Consequently, the opening pilot pressure, which is introduced through the compression pilot line 20, increases, and the valve opening pressure of the main damping valve 14 decreases because the opening pilot pressure acts on the main damping valve 14 in the direction which opens the valve 14. Accordingly, by changing the passage area of the variable orifice 17, the flow path area of the compression sub-passage 13 [i.e. orifice characteristics (orifice 18c) and valve characteristics (pressure-regulating valve 18b)] is directly changed, and the opening pilot pressure is also changed. Thus, the valve opening pressure (valve characteristics) of the main damping valve 14 can be changed. Therefore, the damping force characteristic control range can be widened.

Thus, appropriate damping force can be obtained over the piston speed range from the low speed region to the intermediate speed region by the extension and compression sub-damping valves 15 and 18, and it is possible to control the orifice and valve characteristics for the extension and compression strokes by controlling the flow path area of each of the variable orifices 16 and 17. Accordingly, appropriate damping force can be obtained over the entire piston speed range from the low speed region to the high speed region. In addition, it is possible to increase the degree of freedom for setting damping force characteristics because the characteristics of the extension and compression sub-damping valves 15 and 18 can be set independently of the valve opening point of the main damping valve 14.

It should be noted that in the foregoing embodiment the extension sub-damping valve 15 and variable orifice 16 of the extension sub-passage 12 may be replaced with each other. In such a case, the pilot pressure for the main damping valve 14, which is introduced through the extension pilot line 19, can be changed according to the passage area of the variable orifice 16. Similarly, the variable orifice 17 and compression sub-damping valve 18 of the compression sub-passage 13 may be replaced with each other. In such a case, the pilot pressure for the main damping valve 14, which is introduced through the compression pilot line 20, can be changed according to the passage area of the variable orifice 17. Although in the foregoing embodiment the orifices 15a and 18a of the extension and compression sub-damping valves 15 and 18 are disposed on the upstream sides of the pressure-regulating valves 15b and 18b and the orifices 15c and 18c, the orifices 15a and 18a may be disposed on the downstream sides of the valves 15b and 18b and the orifices 15c and 18c.

The arrangement of the damping force control type hydraulic shock absorber according to the first embodiment will be described below more specifically with reference to FIG. 2.

Figure 2:
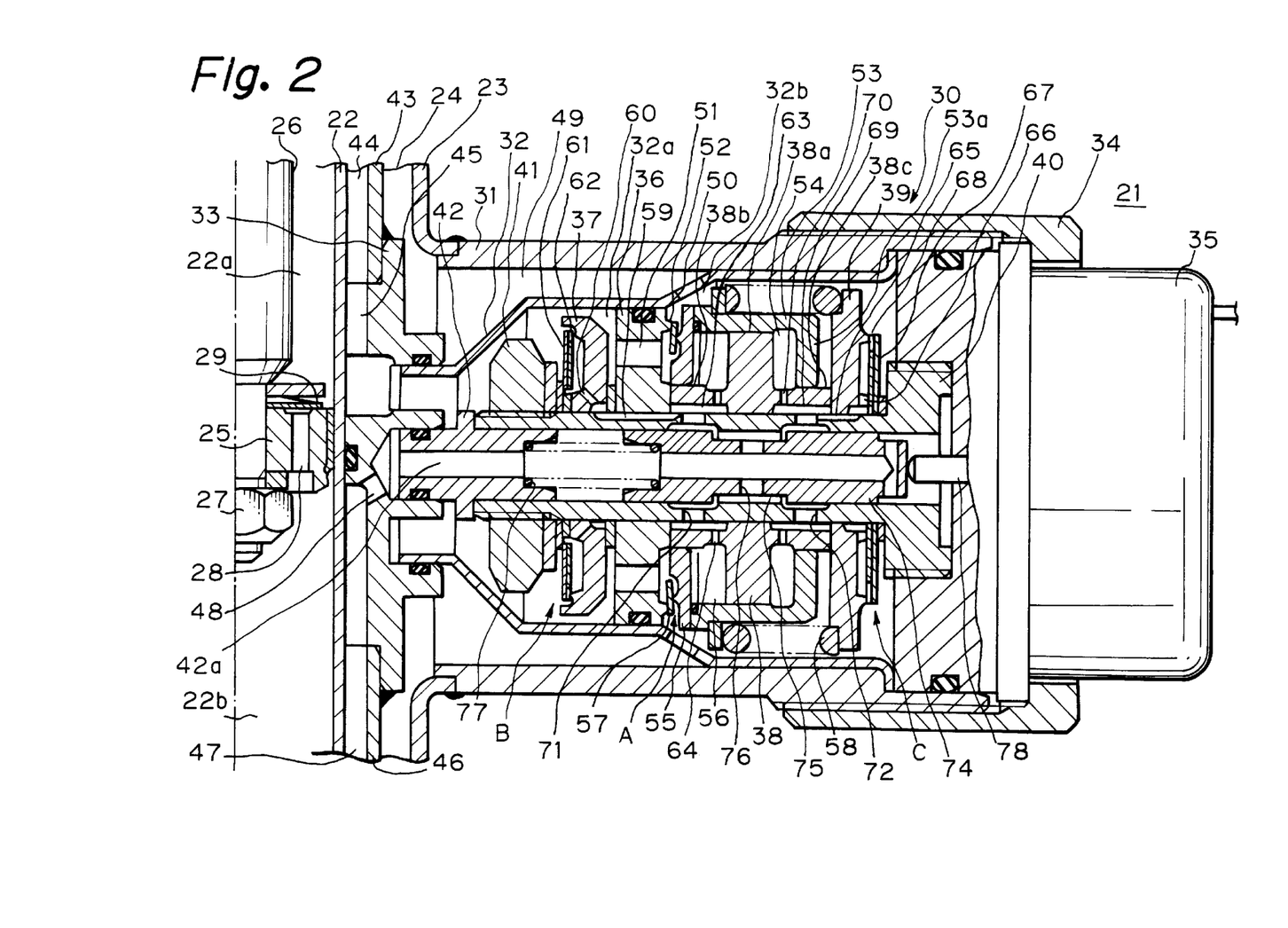
FIG. 2 is a vertical sectional view showing a portion of the damping force control type hydraulic shock absorber according to the first embodiment of the present invention.

As shown in FIG. 2, the damping force control type hydraulic shock absorber 21 according to the first embodiment has a double cylinder structure including a cylinder 22 and an outer cylinder 23 provided outside the cylinder 22. A reservoir 24 is formed between the cylinder 22 and the outer cylinder 23. A piston 25 is slidably fitted in the cylinder 22. The piston 25 divides the inside of the cylinder 22 into two chambers, i.e. a cylinder upper chamber 22a (first chamber) and a cylinder lower chamber 22b (second chamber). The piston 25 is connected with one end of a piston rod 26 by a nut 27. The other end portion of the piston rod 26 extends through the cylinder upper chamber 22a and further through a rod guide (not shown) and a seal member (not shown), which are fitted to the upper end portion of the double cylinder structure which includes the cylinder 22 and the outer cylinder 23, and projects out of the cylinder 22. A base valve (not shown) is provided in the lower end portion of the cylinder 22 to divide the cylinder lower chamber 22b and the reservoir 24 from each other. The cylinder 22 has a hydraulic fluid sealed therein, and the reservoir 24 has a gas sealed therein, together with the hydraulic fluid.

The piston 25 is provided with a hydraulic fluid passage 28 (first communicating passage) for communication between the cylinder upper and lower chambers 22a and 22b. The piston 25 is further provided with a check valve 29 (first check valve) which allows the hydraulic fluid to flow through the hydraulic fluid passage 28 in only one direction from the cylinder lower chamber 22b toward the cylinder upper chamber 22a. The base valve (not shown) is provided with a hydraulic fluid passage (second communicating passage) for communication between the cylinder lower chamber 22b and the reservoir 24. The base valve is further provided with a check valve (second check valve) which allows the hydraulic fluid to flow through the hydraulic fluid passage in only one direction from the reservoir 24 toward the cylinder lower chamber 22b.

A damping force generating mechanism 30 is mounted on a side portion of the outer cylinder 23. The damping force generating mechanism 30 has a cylindrical outer casing 31 which is secured at one end thereof to the side wall of the outer cylinder 23. A cylindrical inner casing 32 is fitted in the outer casing 31. The inner casing 32 is fitted at one end thereof into a passage member 33 fitted on the cylinder 22. The inner casing 32 abuts at the other end thereof on a proportional solenoid actuator (hereinafter referred to as "actuator 35") mounted on the other end of the outer casing 31 by a retainer 34. In this way, the inner casing 32 is secured. A main valve member 36 is fitted in the inner casing 32. The main valve member 36 divides the inside of the inner casing 32 into a hydraulic fluid chamber 32a and a hydraulic fluid chamber 32b. The main valve member 36 is pierced with a cylindrical guide member 40 and secured by a nut 41 screwed on the distal end portion of the guide member 40, together with an annular sub-valve member 37 disposed in the hydraulic fluid chamber 32a and an approximately cylindrical fixed member 38 and an annular sub-valve member 39, which are disposed in the hydraulic fluid chamber 32b. The guide member 40 is connected to the actuator 35 by thread engagement. A cylindrical connecting member 42 is attached to the distal end of the guide member 40, and the distal end portion of the connecting member 42 is fitted into the passage member 33.

An upper tube 43 is fitted on an upper part of the cylinder 22 and connected to the passage member 33 to form an annular hydraulic fluid passage 44 between the cylinder 22 and the upper tube 43. The annular hydraulic fluid passage 44 is communicated with the cylinder upper chamber 22a through a hydraulic fluid passage (not shown) provided in the side wall of the cylinder 22 near the upper end thereof, and also communicated with the hydraulic fluid chamber 32a in the inner casing 32 through a hydraulic fluid passage 45 provided in the passage member 33. A lower tube 46 is fitted on a lower part of the cylinder 22 and connected to the passage member 33 to form an annular hydraulic fluid passage 47 between the cylinder 22 and the lower tube 46. The annular hydraulic fluid passage 47 is communicated with the cylinder lower chamber 22b through a hydraulic fluid passage (not shown) provided in the side wall of the cylinder 22 near the lower end thereof, and also communicated with the inside of the guide member 40 through a hydraulic fluid passage 48 provided in the passage member 33 and further through a hydraulic fluid passage 42a in the connecting member 42. The reservoir 24 is communicated directly with a hydraulic fluid passage 49 formed between the outer casing 31 and the inner casing 32, and also communicated with the hydraulic fluid chamber 32b in the inner casing 32 through a hydraulic fluid passage 50 provided in the side wall of the inner casing 32.

The main valve member 36 is provided with a plurality of hydraulic fluid passages 51 (only two of which are shown in the figure) for communication between the hydraulic fluid chambers 32a and 32b. An annular valve seat 52 projects from the main valve member 36 at a position radially outward of the hydraulic fluid passages 51. The fixed member 38 has a large-diameter guide portion 38a formed in a center thereof, and small-diameter guide portions 38b and 38c are formed at both ends, respectively, of the fixed member 38. A cylindrical movable member 53 is slidably fitted on the large-diameter guide portion 38a. The movable member 53 has a flange 53a formed on an inner side of one end thereof. The inner peripheral portion of the flange 53a is slidably fitted on the small-diameter guide portion 38c. A compression back pressure chamber 54 is formed between the large-diameter guide portion 38a and the flange 53a. An annular movable valve member 55 is slidably fitted on the small-diameter guide portion 38b so as to abut on the other end of the movable member 53 in a fluid-tight manner, thereby enabling the movable valve member 55 to move together with the movable member 53 as one unit. An extension back pressure chamber 56 is formed between the movable valve member 55 and the large-diameter guide portion 38a. The movable valve member 55 rests over the valve seat 52 of the main valve member 36 through an annular floating valve 57 and is biased in a valve closing direction, that is, toward the valve seat 52, by a compression spring 58 interposed between the movable member 53 and the sub-valve member 39.

A main damping valve A includes the fixed member 38, the valve seat 52, the movable member 53, the movable valve member 55, the floating valve 57, and the spring 58. In the main damping valve A (pilot-operated main damping valve), when the movable valve member 55 receives the pressure of hydraulic fluid from the hydraulic fluid passages 51, the floating valve 57 opens and generates damping force according to the degree of opening thereof. The valve opening pressure of the floating valve 57, that is, the main damping valve A, is controlled by using the pressure in the extension back pressure chamber 56 as a closing pilot pressure acting in the direction which closes the main damping valve A and also using the pressure in the compression back pressure chamber 54 as an opening pilot pressure acting in the direction for opening the main damping valve A.

The sub-valve member 37 is provided with an orifice 60 for communication between the hydraulic fluid chamber 32a and a hydraulic fluid passage 59 formed in the outer peripheral portion of the guide member 40. Further, the sub-valve member 37 is provided with a normally-closed disk valve 61 which opens by deflecting at the inner peripheral side thereof upon receiving the pressure of hydraulic fluid flowing from the hydraulic fluid chamber 32a toward the orifice 60, thereby controlling the flow path area thereof. The outer peripheral portion of the disk valve 61 is provided with an orifice 62 for constantly providing communication between the hydraulic fluid chamber 32a and the orifice 60. That is, the orifice 62 is disposed in parallel to the disk valve 61. The disk valve 61 and the orifices 60 and 62 constitute an extension sub-damping valve B. The hydraulic fluid passage 59 extends axially of the guide member 40 to communicate with a hydraulic fluid chamber 63 formed in the inner peripheral portion of the small-diameter guide portion 38b of the fixed member 38. The side wall of the small-diameter guide portion 38b is provided with an orifice 64 (first pilot line) for communication between the extension back pressure chamber 56 and the hydraulic fluid chamber 63. It should be noted that the valve opening pressure of the disk valve 61 is set lower than the valve opening pressure of the main damping valve A.

The sub-valve member 39 is provided with an orifice 66 for communication between the hydraulic fluid chamber 32b and a hydraulic fluid passage 65 formed in the outer peripheral portion of the guide member 40. Further, the sub-valve member 39 is provided with a normally-closed disk valve 67 which opens by deflecting at the outer peripheral side thereof upon receiving the pressure of hydraulic fluid flowing from the orifice 66 toward the hydraulic fluid chamber 32b, thereby controlling the flow path area thereof. The outer peripheral portion of the disk valve 67 is provided with an orifice 68 for constantly providing communication between the hydraulic fluid chamber 32b and the orifice 66. That is, the orifice 68 is disposed in parallel to the disk valve 67. The disk valve 67 and the orifices 66 and 68 constitute a compression sub-damping valve C. The hydraulic fluid passage 65 extends axially of the guide member 40 to communicate with a hydraulic fluid chamber 69 formed in the inner peripheral portion of the small-diameter guide portion 38c of the fixed member 38. The side wall of the small-diameter guide portion 38c is provided with an orifice 70 (second pilot line) for communication between the compression back pressure chamber 54 and the hydraulic fluid chamber 69. It should be noted that the valve opening pressure of the disk valve 67 is set lower than the valve opening pressure of the main damping valve A.

The side wall of the guide member 40 is provided with an extension port 71 communicating with the hydraulic fluid chamber 63, and a compression port 72 communicating with the hydraulic fluid chamber 69. A cylindrical spool 74 is slidably fitted in the guide member 40. An annular groove 75 is formed in the outer peripheral portion of the spool 74 so as to face both the extension port 71 and the compression port 72. The annular groove 75 is communicated with the hydraulic fluid passage 42a in the connecting member 42 through a hydraulic fluid passage 76 provided in the side wall of the spool 74 and further through the inside of the spool 74. The extension port 71 and the annular groove 75 constitute an extension variable orifice, and the compression port 72 and the annular groove 75 constitute a compression orifice. The areas of communicating passages between the extension port 71 and the annular groove 75 and between the compression port 72 and the annular groove 75 each change according to the position of the spool 74 such that, when one of the two areas is small, the other is large, and vice versa. The spool 74 abuts at one end thereon on a spring 77. The other end of the spool 74 abuts on a plunger 78 of the actuator 35. The spool 74 is positioned by thrust force from the actuator 35 according to an electric current supplied to the solenoid of the actuator 35.

The operation of this embodiment, arranged as stated above, will be described below.

During the extension stroke of the piston rod 26, as the piston 25 moves, the check valve 29 of the piston 25 is closed, and the hydraulic fluid in the cylinder upper chamber 22a is pressurized, while the pressure in the cylinder lower chamber 22b is reduced. The pressurized hydraulic fluid on the cylinder upper chamber side flows into the hydraulic fluid chamber 32a of the damping force generating mechanism 30 through the annular hydraulic fluid passage 44 and the hydraulic fluid passage 45 and further flows to the cylinder lower chamber 22b through the extension sub-damping valve B, the hydraulic fluid passage 59, the hydraulic fluid chamber 63, the extension port 71, the annular groove 75, the hydraulic fluid passage 76, the inside of the spool 74, the inside of the guide member 40, the hydraulic fluid passage 42a in the connecting member 42, the hydraulic fluid passage 48, and the annular hydraulic fluid passage 47 (extension sub-passage). When the pressure on the cylinder upper chamber side reaches the valve opening pressure of the main damping valve A, the hydraulic fluid flows from the hydraulic fluid chamber 32a to the hydraulic fluid chamber 32b through the hydraulic fluid passages 51 and the main damping valve A and further passes through the hydraulic fluid passage 50 and the hydraulic fluid passage 49 to flow into the reservoir 24 (main passage). Meanwhile, an amount of hydraulic fluid corresponding to an amount by which the piston rod 26 withdraws from the cylinder 22 flows from the reservoir 24 to the cylinder lower chamber 22b.

When the piston speed is low before the main damping valve A opens, damping force is generated according to the flow path area of the extension sub-damping valve B and the passage area of communication between the extension port 71 and the annular groove 75. At this time, in the extension sub-damping valve B, damping force due to orifice characteristics is generated by the orifice 62 before the disk valve 61 opens. After the disk valve 61 has opened, the flow path area is controlled according to the degree of opening of the disk valve 61, thereby generating damping force of valve characteristics. Thus, appropriate damping force can be obtained over the piston speed range from the low speed region to the intermediate speed region.

As the piston speed increases, the pressure in the cylinder upper chamber 22a rises, and eventually the main damping valve A opens. After the main damping valve A has opened, damping force according to the degree of opening of the valve A is generated. At this time, as the passage area of communication between the extension port 71 and the annular groove 75 decreases, the pressure loss increases, and the pressure on the upstream side of the port 71 and groove 75 increases. Consequently, the closing pilot pressure, which is introduced into the extension back pressure chamber 56 through the orifice 64, increases, and the valve needed to open the main damping valve A increases because the closing pilot pressure acts in the direction for closing the main damping valve A. Accordingly, by changing the passage area of communication between the extension port 71 and the annular groove 75 through the movement of the spool 74 by the actuator 35, the passage area of the extension sub-passage [i.e. orifice characteristics (orifice 62) and valve characteristics (disk valve 61)] is directly changed, and the closing pilot pressure is also changed. Thus, the valve opening pressure (valve characteristics) of the main damping valve A can be changed. Therefore, the damping force characteristic control range can be widened.

Hydraulic fluid passing through the orifice 64, which introduces the closing pilot pressure into the extension back pressure chamber 56, includes an amount of hydraulic fluid corresponding to a volumetric change of the extension back pressure chamber 56 caused by the sliding movement of the movable member 53, and an amount of hydraulic fluid corresponding to an amount by which the hydraulic fluid is compressed. By restricting the flow path to the extension back pressure chamber 56, a damping action can be applied to the operation of the main damping valve A. Thus, it is possible to prevent generation of noise and to obtain frequency-sensitive damping force characteristics. More specifically, the pressure on the cylinder upper chamber side acts directly on the movable valve member 55 of the main damping valve A, whereas the pilot pressure in the extension back pressure chamber 56 has a first-order lag due to restriction by the orifice 64. Therefore, with respect to a high-frequency input to the piston rod 26, the valve opening pressure of the main damping valve A decreases to suppress an increase in damping force. With respect to a low-frequency input, the valve opening pressure of the main damping valve A increases to enable sufficient damping force to be generated, thereby making it possible to improve the ride quality and to reduce noise.

During the compression stroke of the piston rod 26, as the piston 25 moves, the check valve 29 of the piston 25 opens, and the hydraulic fluid in the cylinder lower chamber 22b passes through the hydraulic fluid passage 28 and flows directly into the cylinder upper chamber 22a. Meanwhile, the check valve of the base valve is closed, and the hydraulic fluid in the cylinder upper and lower chambers 22a and 22b is pressurized by the entry of the piston rod 26 into the cylinder 22. The pressurized hydraulic fluid flows from the cylinder lower chamber 22b to the reservoir 24 through the annular hydraulic fluid passage 47, the hydraulic fluid passage 48, the hydraulic fluid passage 42a, the inside of the guide member 40, the inside of the spool 74, the hydraulic fluid passage 76, the annular groove 75, the compression port 72, the hydraulic fluid passage 65, the compression sub-damping valve C, the hydraulic fluid chamber 32b, the hydraulic fluid passage 50, and the hydraulic fluid passage 49 (compression sub-passage). When the pressure in the cylinder upper and lower chambers 22a and 22b reaches the valve opening pressure of the main damping valve A, the hydraulic fluid flows from the cylinder upper chamber 22a to the hydraulic fluid chamber 32b through the annular hydraulic fluid passage 44, the hydraulic fluid passage 45, the hydraulic fluid chamber 32a, the hydraulic fluid passages 51, and the main damping valve A, and further flows to the reservoir 24 through the hydraulic fluid passage 50 and the hydraulic fluid passage 49 (main passage).

Accordingly, when the piston speed is low before the main damping valve A opens, damping force is generated according to the flow path area of the compression sub-damping valve C and the passage area of communication between the compression port 72 and the annular groove 75. At this time, in the compression sub-damping valve C, damping force due to orifice characteristics is generated by the orifice 68 before the disk valve 67 opens. After the disk valve 67 has opened, the flow path area is controlled according to the degree of opening of the disk valve 67, thereby generating damping force due to valve characteristics. Thus, appropriate damping force can be obtained over the piston speed range of from the low speed region to the intermediate speed region.

As the piston speed increases, the pressure in the cylinder upper and lower chambers 22a and 22b rises, and eventually the main damping valve A opens. After the main damping valve A has opened, damping force according to the degree of opening of the valve A is generated. At this time, as the passage area of communication between the compression port 72 and the annular groove 75 increases, the pressure loss decreases, and the pressure on the downstream side of the port 72 and groove 75 increases. Consequently, the opening pilot pressure, which is introduced into the compression back pressure chamber 54 through the orifice 70, increases, and the valve opening pressure of the main damping valve A decreases because the opening pilot pressure acts in the direction for opening the main damping valve A. Accordingly, by changing the passage area of communication between the compression port 72 and the annular groove 75 through the movement of the spool 74 by the actuator 35, the passage area of the compression sub-passage [i.e. orifice characteristics (orifice 68) and valve characteristics (disk valve 67)] is directly changed, and the pilot pressure is also changed. Thus, the valve opening pressure of the main damping valve A (valve characteristics) can be changed. Therefore, the damping force characteristic control range can be widened. It should be noted that the flow path to the compression back pressure chamber 54 is restricted by the orifice 70, and thus each of the opening and closing pilot pressures for the main damping valve A has a first-order lag; therefore, it is possible to prevent generation of noise and to obtain frequency-sensitive damping force characteristics as in the case of the extension stroke.

Moreover, the passage area of communication between the extension port 71 and the annular groove 75 (extension variable orifice) and the passage area of communication between the compression port 72 and the annular groove 75 (compression variable orifice) are so related that, when one of the two passage areas is small, the other is large, and vice versa. Therefore, it is possible to select a combination of different damping force characteristics for the extension and compression strokes (e.g. a combination of "hard" characteristics for the extension stroke and "soft" characteristics for the compression side, and vice versa).

Thus, damping force characteristics can be controlled according to an electric current supplied to the actuator 35, and it is possible to select a combination of different damping force characteristics for the extension and compression strokes. Moreover, characteristics of the extension and compression sub-damping valves B and C can be set independently of the valve opening point of the main damping valve A. Therefore, it is possible to increase the degree of freedom for setting damping force characteristics. Furthermore, the extension and compression sub-damping valves B and C are provided in the extension and compression sub-passages, respectively, where the flow rate is relatively low (of the order of 10 1/min), and the main damping valve is shared between the extension and compression strokes in the main passage, where the flow rate is high. Therefore, the arrangement is superior in space efficiency, and it is possible to achieve a reduction in the size and weight of the apparatus.

Next, a hydraulic circuit of a damping force control type hydraulic shock absorber according to a second embodiment of the present invention will be described with reference to FIG. 3. It should be noted that the damping force control type hydraulic shock absorber according to the second embodiment is similar in structure to the hydraulic shock absorber body portion according to the first embodiment, shown in FIG. 1, except that the structures of the main and sub-passages for generating damping force are different. Therefore, the same members or portions as those shown in FIG. 1 are denoted by the same reference numerals, and only portions in which the second embodiment differs from the first embodiment will be described below in detail.

Figure 3:
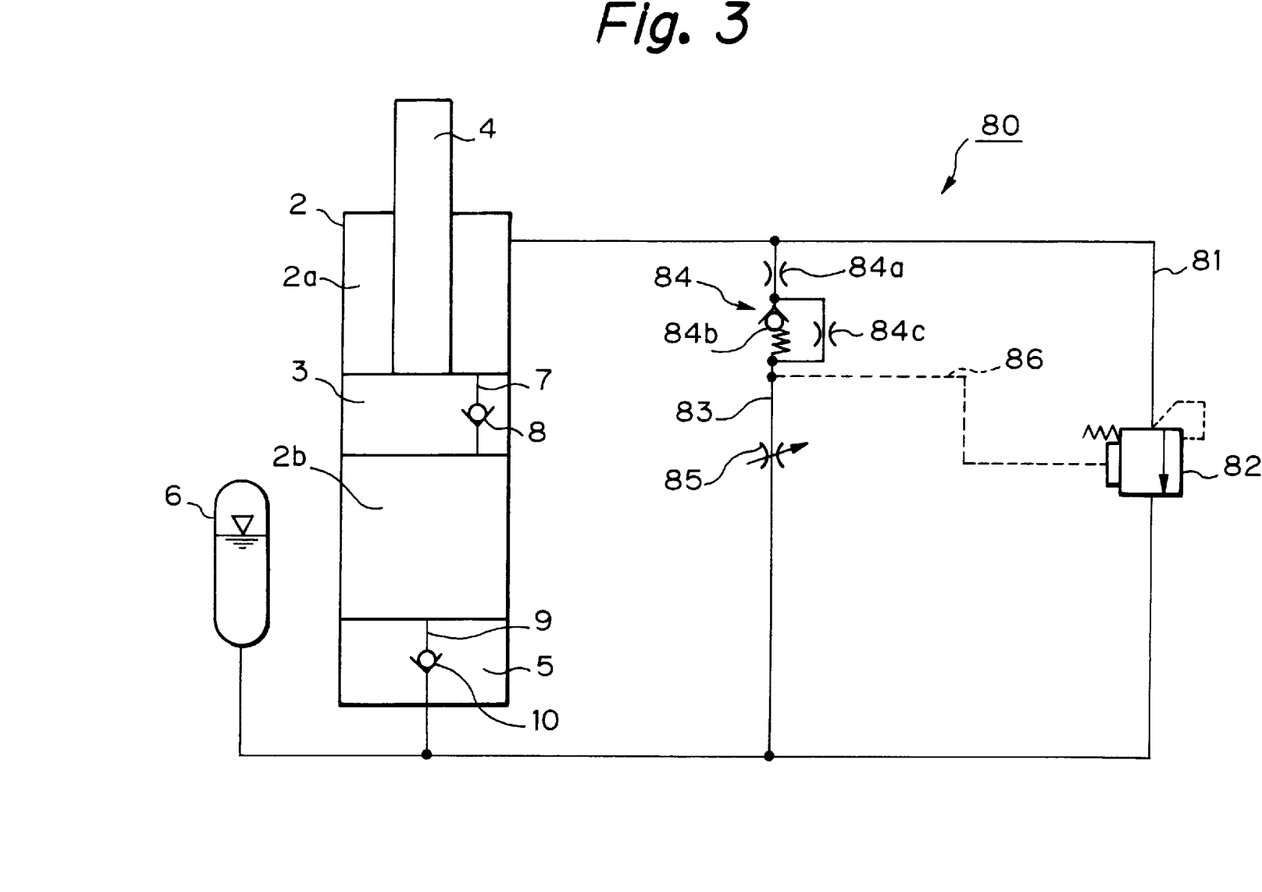
FIG. 3 is a hydraulic circuit diagram of a damping force control type hydraulic shock absorber according to a second embodiment of the present invention.

As shown in FIG. 3, in the damping force control type hydraulic shock absorber 80 according to the second embodiment, a main passage 81 is provided outside the cylinder 2 to provide communication between the cylinder upper chamber 2a and the reservoir 6. The main passage 81 is provided with a pilot-operated main damping valve 82 (hereinafter referred to as "main damping valve 82"). The main passage 81 is connected with a sub-passage 83 for allowing the cylinder upper chamber 2a and the reservoir 6 to communicate with each other, bypassing the main damping valve 82. The sub-passage 83 is provided with a sub-damping valve 84 and a variable orifice 85. The variable orifice 85 is located on the downstream side (i.e. the reservoir side) of the sub-damping valve 84.

The main damping valve 82 is a pilot-operated pressure control valve which opens upon receiving pressure on the cylinder upper chamber side of the main passage 81 and generates damping force according to the degree of opening of the valve 82. A pilot line 86 of the main damping valve 82 is connected to a point of the sub-passage 83 between the sub-damping valve 84 and the variable orifice 85 to introduce the pressure at that point as a pilot pressure. The arrangement is such that the valve opening pressure of the main damping valve 82 increases as the pilot pressure rises.

The sub-damping valve 84 includes an orifice 84a and a pressure-regulating valve 84b, which are disposed in series in order from the upstream side, and an orifice 84c disposed in parallel to the pressure-regulating valve 84b.

The orifice 84a prevents an excessive increase of damping force due to a rise in the pilot pressure acting in the direction for closing the main damping valve 82 in the high piston speed region on a low damping force characteristic setting (where the flow path area of the variable orifice 86 is the largest), and the flow path area of the orifice 84a is set to be about ½ of the smallest flow path area of the downstream side of the sub-damping valve 84 when the variable orifice 85 is fully open, as in the case of the extension sub-damping valve 15 in the first embodiment.

The pressure-regulating valve 84b is normally closed, but opens according to the pressure of hydraulic fluid and controls the flow path area according to the degree of opening of the valve 84b. It should be noted that the orifice 84a may be omitted in a case where the pressure-reducing effect of the pressure-regulating valve 84b is so powerful in the high piston speed region that the flow resistance of the pressure-regulating valve 84b can satisfactorily hold the pilot pressure at such a low level that the pressure loss in the sub-passage 83 on the downstream side of the sub-damping valve 84 causes no problem.

The orifice 84c prevents an excessive reduction of damping force in the low piston speed region on a high damping force characteristic setting (where the flow path area of the variable orifice 85 is the smallest), and the flow path area of the orifice 84c is set equivalent to about 2 to 3 times a flow path area at which a leakage is produced on the downstream side of the sub-damping valve 84 when the variable orifice 85 is fully closed, as in the case of the extension sub-damping valve 15 in the first embodiment.

The operation of this embodiment, arranged as stated above, will be described below.

During the extension stroke of the piston rod 4, as the piston 3 moves, the check valve 8 of the piston 3 is closed, and the hydraulic fluid in the cylinder upper chamber 2a is pressurized. Consequently, the hydraulic fluid flows to the reservoir 6 through the main passage 81 and the sub-passage 83. Meanwhile, an amount of hydraulic fluid corresponding to an amount of movement of the piston rod 4 flows into the cylinder lower chamber 2b from the reservoir 6 through the check valve 10 of the base valve 5.

When the piston speed is low before the main damping valve 82 of the main passage 81 opens, damping force is generated by the sub-damping valve 84 and variable orifice 85 of the sub-passage 83. At this time, in the sub-damping valve 84, damping force due to orifice characteristics is generated by the orifice 84c before the pressure-regulating valve 84b opens. After the pressure-regulating valve 84b has opened, the flow path area is controlled according to the degree of opening of the valve 84b, thereby generating damping force due to valve characteristics. Thus, appropriate damping force can be obtained over the piston speed range of from the low speed region to the intermediate speed region.

As the piston speed increases, the pressure in the cylinder upper chamber 2a rises, and eventually the main damping valve 82 opens. After the main damping valve 82 has opened, damping force according to the degree of opening of the valve 82 is generated. At this time, as the passage area of the variable orifice 85 decreases, the pressure loss increases, and the pressure on the upstream side of the variable orifice 85 increases. Consequently, the pilot pressure introduced through the pilot line 86 increases, and the valve opening pressure of the main damping valve 82 increases because the pilot pressure acts in the direction for closing the main damping valve 82. Accordingly, by changing the passage area of the variable orifice 85, the flow path area of the sub-passage 83 [i.e. orifice characteristics (orifice 84c) and valve characteristics (pressure-regulating valve 84b)] is directly changed, and the pilot pressure is also changed. Thus, the valve opening pressure of the main damping valve 82 (valve characteristics) can be changed. Therefore, the damping force characteristic control range can be widened.

During the compression stroke of the piston rod 4, as the piston 3 moves, the check valve 10 of the base valve 5 is closed. Consequently, the hydraulic fluid in the cylinder lower chamber 2b flows into the cylinder upper chamber 2a through the check valve 8 of the piston 3, and an amount of hydraulic fluid corresponding to an amount by which the piston rod 4 enters the cylinder 2 flows from the cylinder upper chamber 2a toward the reservoir 6 through the main passage 81 and the sub-passage 83 as in the case of the extension stroke.

Thus, damping force can be generated and controlled as in the case of the extension stroke. It should be noted that during the compression stroke the pressure-receiving area of the piston rod acts as an effective piston area, and it is smaller than during the extension stroke; therefore, damping force is correspondingly smaller than during the extension stroke.

Thus, the sub-damping valve 84 enables appropriate damping force to be obtained over the piston speed range of from the low speed region to the intermediate speed region, and it is possible to control orifice and valve characteristics for the extension and compression strokes by controlling the flow path area of the variable orifice 85. Accordingly, appropriate damping force can be obtained over the entire piston speed range of from the low speed region to the high speed region. Further, because the main damping valve 82 and the sub-damping valve 84 are disposed in parallel, characteristics of the sub-damping valve 84 can be set independently of the valve opening point of the main damping valve 82. Therefore, it is possible to increase the degree of freedom for setting damping force characteristics.

In the second embodiment also, the sub-damping valve 84 and variable orifice 85 of the sub-passage 83 may be replaced with each other. In such a case also, the pilot pressure of the main damping valve 82, which is introduced through the pilot line 86, can be changed according to the passage area of the variable orifice 85. Although in the second embodiment the orifice 84a of the sub-damping valve 84 lies on the upstream side of the pressure-regulating valve 84b and the orifice 84c, it may be disposed on the downstream side of the valve 84b and the orifice 84c.

The arrangement of the damping force control type hydraulic shock absorber according to the second embodiment will be described below more specifically with reference to FIGS. 4 and 5.

Figure 4:
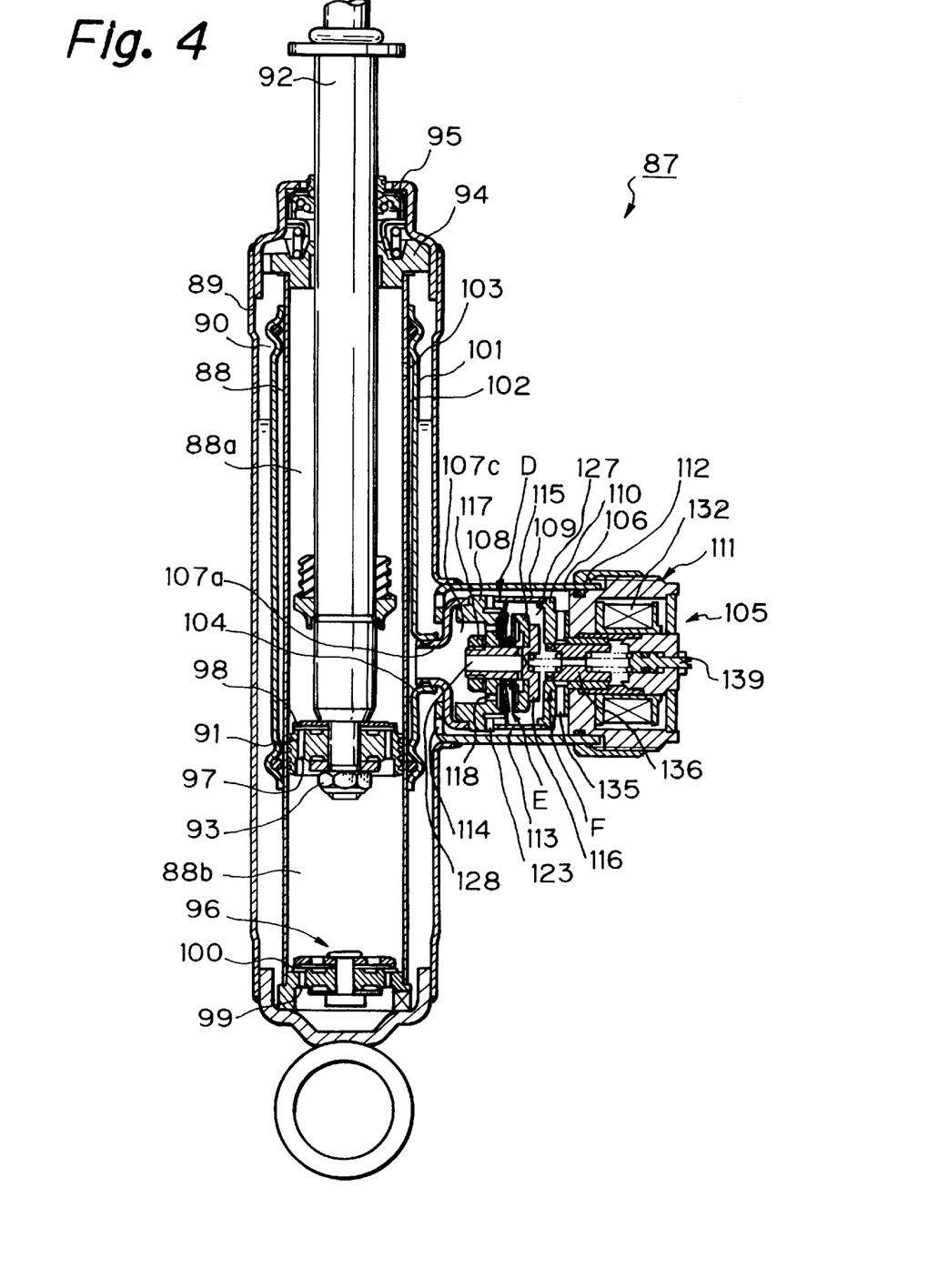
FIG. 4 is a vertical sectional view of the damping force control type hydraulic shock absorber according to the second embodiment of the present invention.
Figure 5:
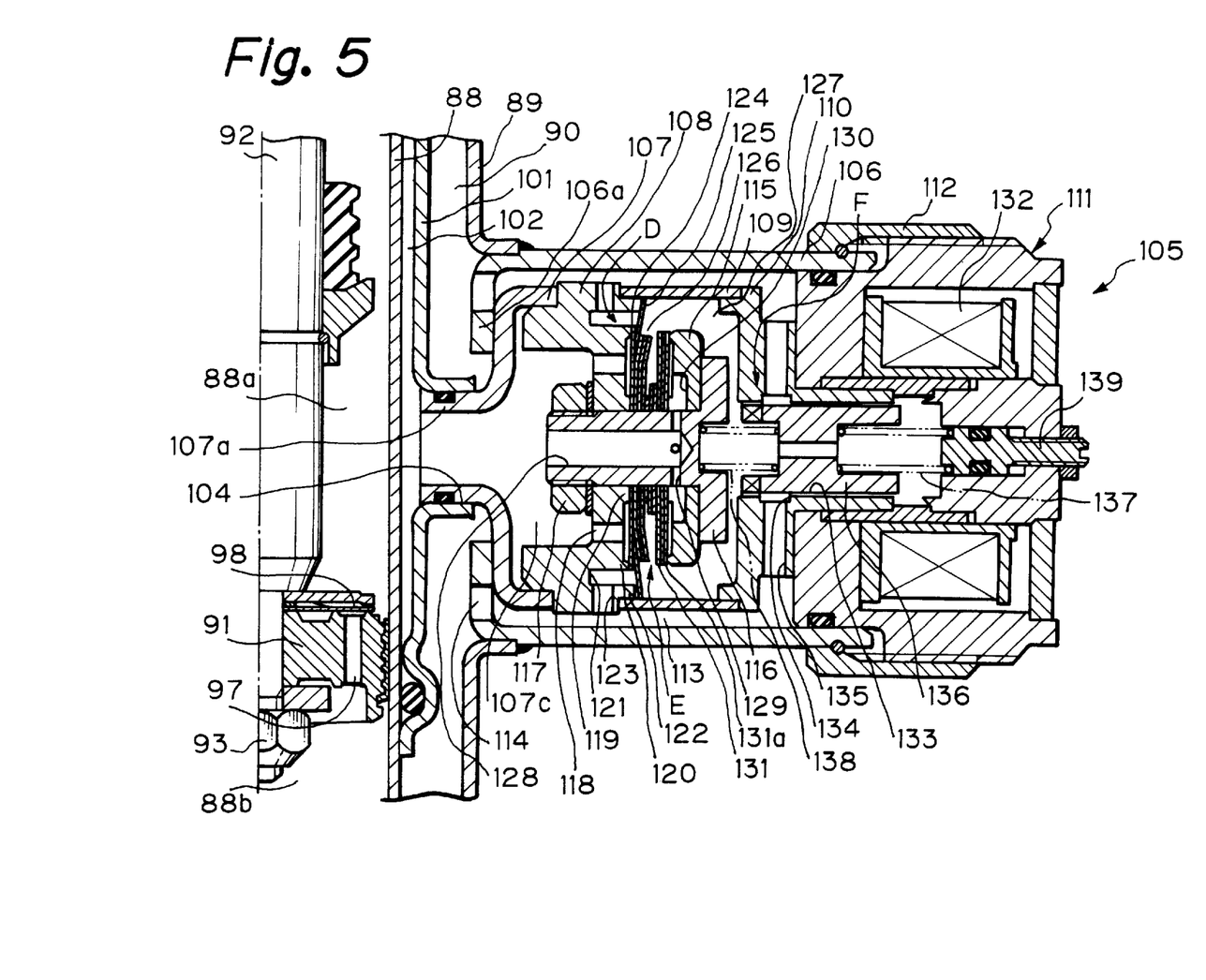
FIG. 5 is an enlarged view showing a portion of the hydraulic shock absorber shown in FIG. 4.

As shown in FIGS. 4 and 5, the damping force control type hydraulic shock absorber 87 according to the second embodiment has a double cylinder structure comprising a cylinder 88 and an outer cylinder 89 provided outside the cylinder 88. A reservoir 90 is formed between the cylinder 88 and the outer cylinder 89. A piston 91 is slidably fitted in the cylinder 88. The piston 91 divides the inside of the cylinder 88 into two chambers, that is, a cylinder upper chamber 88a (first chamber) and a cylinder lower chamber 88b (second chamber). The piston 91 is connected with one end of a piston rod 92 by a nut 93. The other end portion of the piston rod 92 extends through the cylinder upper chamber 88a and further through a rod guide 94 and an oil seal 95, which are fitted to the upper end portion of the double cylinder structure which includes the cylinder 88 and the outer cylinder 89, and projects out of the cylinder 88. A base valve 96 is provided in the lower end portion of the cylinder 88 to divide the cylinder lower chamber 88b and the reservoir 90 from each other. The cylinder 88 has a hydraulic fluid sealed therein, and the reservoir 90 has a gas sealed therein, together with the hydraulic fluid.

The piston 91 is provided with a hydraulic fluid passage 97 (first communicating passage) for communication between the cylinder upper and lower chambers 88a and 88b. The piston 91 is further provided with a check valve 98 (first check valve) which allows the hydraulic fluid to flow through the hydraulic fluid passage 97 in only one direction from the cylinder lower chamber 88b toward the cylinder upper chamber 88a. The base valve 96 is provided with a hydraulic fluid passage 99 (second communicating passage) for communication between the cylinder lower chamber 88b and the reservoir 90. The base valve 96 is further provided with a check valve 100 (second check valve) which allows the hydraulic fluid to flow through the hydraulic fluid passage 99 in only one direction from the reservoir 90 toward the cylinder lower chamber 88b.

A tube 101 is fitted on the cylinder 88 to form an annular passage 102 between the cylinder 88 and the tube 101. The annular passage 102 is communicated with the cylinder upper chamber 88a through a hydraulic fluid passage 103 provided in the side wall of the cylinder 88 near the upper end thereof. The side wall of the tube 101 is provided with an opening 104.

A damping force generating mechanism 105 is mounted on a side portion of the outer cylinder 89. The damping force generating mechanism 105 includes a cylindrical casing 106 having a flange 106a at one open end thereof. The open end portion of the casing 106 is welded to the side wall of the outer cylinder 89. In the casing 106, a passage member 107, a valve member 108, a cylindrical member 109, and a guide member 110 are inserted in order from the flange side so as to abut on one another. A proportional solenoid actuator 111 is fitted into the other open end of the casing 106 and secured by screwing into a retainer 112. The proportional solenoid actuator 111 is brought into contact with the guide member 110, thereby securing the passage member 107, the valve member 108, the cylindrical member 109, and the guide member 110.

The passage member 107 has a small-diameter opening portion 107a at one end thereof. The small-diameter opening portion 107a is fitted into the opening 104 of the tube 101, and thus a hydraulic fluid chamber 107c formed in the passage member 107 is communicated with the annular passage 102. An annular hydraulic fluid passage 113 is formed between the passage member 107 and the cylindrical member 109 on the one hand and the casing 106 on the other. The annular hydraulic fluid passage 113 is communicated with the reservoir 90 through a hydraulic fluid passage 114 provided in the flange 106a of the casing 106. An annular sub-valve member 115 is disposed inside the cylindrical member 109. A pin 116 is inserted into an opening provided in the center of the sub-valve member 115, and a nut 117 is screwed onto the distal end of the pin 116, thereby securing the sub-valve member 115 to the valve member 108.

The valve member 108 is an approximately disk-shaped member having a plurality (only two of them are shown) of circumferentially spaced hydraulic fluid passages 118 axially extending therethrough. An annular inner seal portion 119 projects from one end portion of the valve member 108 at a position radially inward of the hydraulic fluid passages 118. An annular valve seat 120 projects from the end portion of the valve member 108 at a position radially outward of the hydraulic fluid passages 118. An annular groove 121 is formed in the end portion of the valve member 108 at a position radially outward of the valve seat 120. Moreover, an annular outer seal portion 122 projects from the end portion of the valve member 108 at a position radially outward of the annular groove 121. The outer peripheral portion of the outer seal portion 122 is in contact with the inner peripheral surface of the valve member 109. The annular groove 121 is communicated with the annular hydraulic fluid passage 113 through a hydraulic fluid passage 123.

The valve member 108 is provided with a disk valve 124 which is secured at an inner peripheral portion thereof to the inner seal portion 119, with its outer peripheral portion resting on the valve seat 120. An annular seal disk 125 is provided such that an inner peripheral portion thereof abuts on the back of the disk valve 124, and an outer peripheral portion thereof abuts on the outer seal portion 122. A disk-shaped valve spring 126 including a stack of spring elements is secured at an inner peripheral portion thereof to the pin 116. The valve spring 126 abuts at an outer peripheral portion thereof on the seal disk 125, thereby pressing the seal disk 125 toward the outer seal portion 122, together with the disk valve 124. The disk valve 124 and the seal disk 125 form a pilot chamber 127 in the cylindrical member 109.

The valve member 108, the disk valve 124, the seal disk 125, and the pilot chamber 127 constitute a main damping valve D (pilot-operated main damping valve). In the main damping valve D, the disk valve 124 opens upon receiving the pressure of hydraulic fluid from the hydraulic fluid passages 118 and generates damping force according to the degree of opening of the valve 124. Further, the valve opening pressure of the disk valve 124, that is, the main damping valve D, is controlled by the pressure (acting in the direction for closing the main damping valve D) in the pilot chamber 127 (pilot line).

The sub-valve member 115 is provided with a hydraulic fluid passage 130 allowing the hydraulic fluid chamber 107c and the pilot chamber 127 to communicate with each other through a hydraulic fluid passage 128 and a fixed orifice 129, which are formed in the pin 116. The sub-valve member 115 is further provided with a normally-closed sub-disk valve 131 which opens upon receiving the pressure of hydraulic fluid in the hydraulic fluid passage 130 and generates damping force according to the degree of opening of the valve 131. The sub-disk valve 131 is provided with an orifice 131a (cut portion) for constantly providing communication between the hydraulic fluid passage 130 and the pilot chamber 127. The sub-disk valve 131 and the orifice 131a constitute a sub-damping valve E.

The guide member 110 is provided with a bore 133 facing opposite to a solenoid 132 of the proportional solenoid actuator 111 and communicating with the pilot chamber 127. An annular groove 134 is formed in the inner peripheral surface of the bore 133. The annular groove 134 is communicated with the annular hydraulic fluid passage 113 through a hydraulic fluid passage 135. The bore 133 is slidably fitted with a spool 136. The bore 133 and the spool 136 constitute a flow control valve F (variable orifice). The spool 136 moves according to an electric current supplied to the solenoid 132 of the proportional solenoid actuator 111 against biasing force from springs 137 and 138 to open and close the annular groove 134, thereby controlling the flow path area of a passage formed between the bore 133 and the hydraulic fluid passage 135. The proportional solenoid actuator 111 is provided with an adjusting screw 139 for controlling the initial load applied from the spring 137 to the spool 136.

In the above-described arrangement, the hydraulic fluid passage 103, the annular passage 102, the small-diameter opening portion 107a, the hydraulic fluid chamber 107c, the hydraulic fluid passages 118, the annular groove 121, the hydraulic fluid passage 123, the annular hydraulic fluid passage 113, and the hydraulic fluid passage 114 constitute a main passage for communication between the cylinder upper chamber 88a and the reservoir 90. The hydraulic fluid passage 128, the fixed orifice 129, the hydraulic fluid passage 130, the pilot chamber 127, the bore 133, the annular groove 134, and the hydraulic fluid passage 135 constitute a sub-passage bypassing the main damping valve D.

The operation of this embodiment, arranged as stated above, will be described below.

During the extension stroke of the piston rod 92, as the piston 91 moves, the check valve 98 of the piston 91 is closed, and the hydraulic fluid in the cylinder upper chamber 88a is pressurized. Consequently, the hydraulic fluid flows to the hydraulic fluid chamber 107c of the damping force generating mechanism 105 through the hydraulic fluid passage 103, the annular passage 102, and the small-diameter opening portion 107a, and further flows to the reservoir 90 through the hydraulic fluid passage 128, the fixed orifice 129, the hydraulic fluid passage 130, the sub-damping valve E, the pilot chamber 127, the bore 133, the annular groove 134, the hydraulic fluid passage 135, the annular hydraulic fluid passage 113, and the hydraulic fluid passage 114. When the pressure on the cylinder upper chamber side reaches the valve opening pressure of the main damping valve D during the extension stroke, the main damping valve D opens to allow the hydraulic fluid to flow from the hydraulic fluid chamber 107c to the annular hydraulic fluid passage 113 through the hydraulic fluid passages 118, the annular groove 121, and the hydraulic fluid passage 123. Meanwhile, an amount of hydraulic fluid corresponding to an amount of movement of the piston 91 flows from the reservoir 90 to the cylinder lower chamber 88b through the check valve 100 of the base valve 96.

When the piston speed is low before the main damping valve D opens, damping force is generated according to the flow path area of the sub-damping valve E and flow control valve F. At this time, in the sub-damping valve E, damping force of orifice characteristics is generated by the orifice 131a before the disk valve 131 opens. After the disk valve 131 has opened, the flow path area is controlled according to the degree of opening of the valve 131, thereby generating damping force due to valve characteristics. Thus, appropriate damping force can be obtained over the piston speed range of from the low speed region to the intermediate speed region.

As the piston speed increases, the pressure in the cylinder upper chamber 88a rises, and eventually the main damping valve D opens. After the main damping valve D has opened, damping force according to the degree of opening of the valve D is generated. At this time, as the flow path area of the flow control valve F reduces, the pressure loss increases, and the pressure in the pilot chamber 127, which is upstream the flow control valve F, increases. Consequently, the pilot pressure of the main damping valve D increases, and the valve opening pressure of the main damping valve D increases because the pilot pressure acts in the direction for closing the disk valve 124. Accordingly, by changing the flow path area of the flow control valve F with an electric current supplied to the solenoid 132, orifice characteristics are directly controlled, and the pressure in the pilot chamber 127 (pilot pressure) is also varied to change the valve opening pressure of the main damping valve D. Thus, valve characteristics can be controlled. Therefore, damping force characteristics can be controlled over the piston speed range of from the low speed region to the high speed region.

During the compression stroke of the piston rod 92, as the piston 91 moves, the check valve 100 of the base valve 96 is closed. Consequently, the hydraulic fluid in the cylinder lower chamber 88b flows into the cylinder upper chamber 88a through the check valve 98 of the piston 91, and an amount of hydraulic fluid corresponding to an amount by which the piston rod 92 enters the cylinder 88 flows from the cylinder upper chamber 88a to the reservoir 90 through a flow path similar to that during the extension stroke.

Thus, when the piston speed is low before the main damping valve D opens, damping force due to orifice characteristics is generated by the flow path area of the sub-damping valve E and flow control valve F as in the case of the extension stroke. As the piston speed increases, the pressure on the cylinder upper chamber side rises, and eventually the main damping valve D opens. After the main damping valve D has opened, damping force due to valve characteristics is generated according to the degree of opening of the valve D as in the case of the extension stroke.

By changing the flow path area of the flow control valve F with an electric current supplied to the solenoid 132, orifice characteristics are directly controlled, and the pressure in the pilot chamber 127 is also changed. Thus, valve characteristics can be controlled. Therefore, damping force characteristics can be controlled over the piston speed range of from the low speed region to the high speed region. It should be noted that during the compression stroke the pressure-receiving area of the piston rod acts as an effective piston area, and it is smaller than during the extension stroke; therefore, damping force is correspondingly smaller than during the extension stroke.

Thus, the sub-damping valve E enables appropriate damping force to be obtained over the piston speed range from the low speed region to the intermediate speed region, and it is possible to control orifice and valve characteristics for the extension and compression strokes by controlling the flow path area of the flow control valve F. Accordingly, appropriate damping force can be obtained over the entire piston speed range from the low speed region to the high speed region. In addition, because the main damping valve D and the sub-damping valve E are disposed in parallel, characteristics of the sub-damping valve E can be set independently of the valve opening point of the main damping valve D. Therefore, it is possible to increase the degree of freedom for setting damping force characteristics.

What is claimed is:

1. A damping force control type hydraulic shock absorber comprising:

a cylinder adapted to seal hydraulic fluid therein;

a reservoir adapted to seal gas and hydraulic fluid therein;

a piston slidably fitted in said cylinder and dividing an interior of said cylinder into a first chamber and a second chamber;

a piston rod having one end connected to said piston and a second end extending through said first chamber out of said cylinder;

a first communicating passage in said piston and fluidically connecting said first and said second chambers;

a first check valve provided in said first communicating passage and operable to allow hydraulic fluid to flow only from said second chamber to said first chamber;

a second communicating passage fluidically connecting said second chamber and said reservoir;

a second check valve provided in said second communicating passage and operable to allow hydraulic fluid to flow only from said reservoir to said second chamber;

a main passage fluidically connecting said first chamber and said reservoir;

a pilot-operated main damping valve provided in said main passage and operable to generate damping force by opening under pressure and thus controlling flow of hydraulic fluid through said main passage;

a sub-passage fluidically connected to said main passage and adapted to allow hydraulic fluid to bypass said main damping valve;

a mechanism provided in said sub-passage and comprising a sub-damping valve and a variably-sized orifice, said sub-damping valve including a pressure regulating valve which is normally closed but opens at a lower pressure than said main damping valve and opens a variable amount corresponding to hydraulic fluid pressure in said sub-passage so as to control a hydraulic fluid flow path size; and a pilot line fluidically connected to said sub-passage between said sub-damping valve and said variably-sized orifice;

wherein the damping force generated by said main damping valve is controlled according to a pilot pressure introduced through said pilot line.

2. The damping force control type hydraulic shock absorber of claim 1, wherein:

said pilot line is positioned to establish a pressure which increases the pressure required to open said main damping valve.

* * * * *